J. F. GREEN & H. B. MAUCK.
FENDER.
APPLICATION FILED OCT. 21, 1914.
1,137,606.
Patented Apr. 27, 1915.
2 SHEETS—SHEET 2.
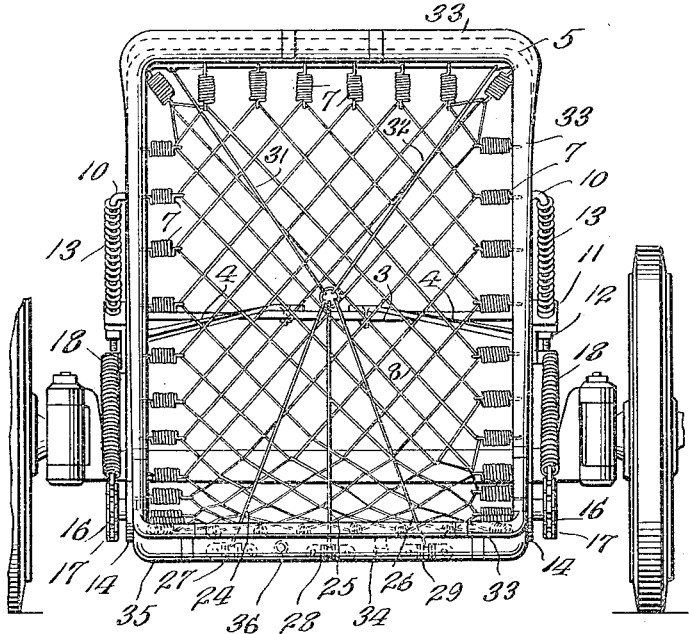
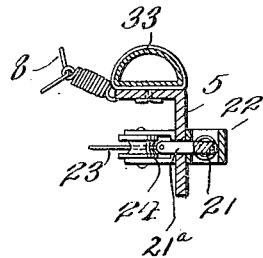
Fig. 6.
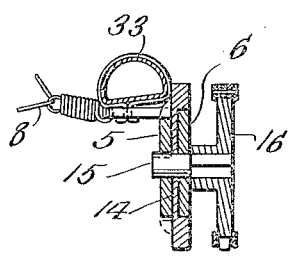
Fig. 3.
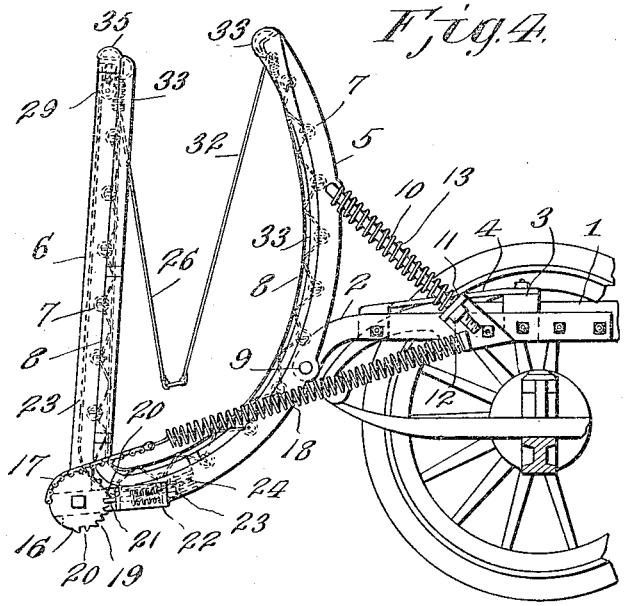
Fig. 4.
Fig. 5.
Witnesses
Frank Hough
Inventors
J. F. Green,
H. B. Mauck.
By Victor J. Evans
Attorney
THE NORRIS PETERS CO., PHOTO-LITHO., WASHINGTON, D. C.

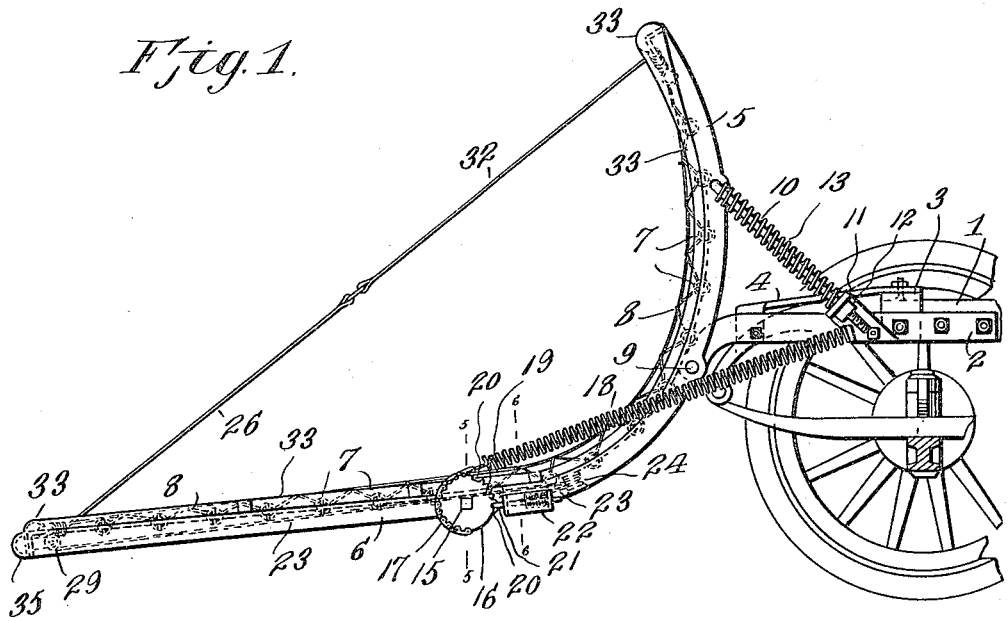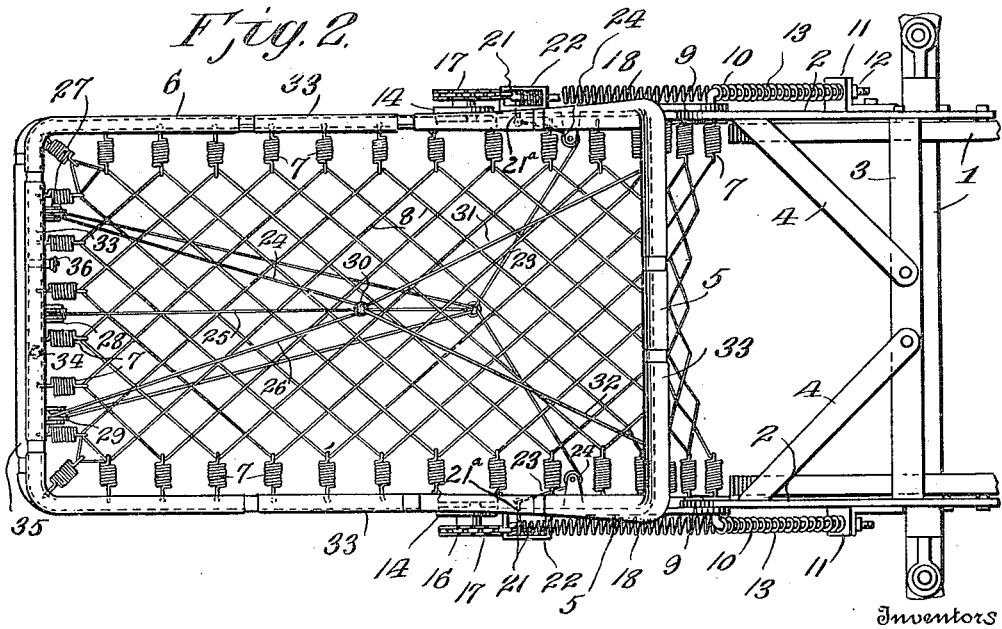

UNITED STATES PATENT OFFICE.

JOHN F. GREEN AND HAYDEN B. MAUCK, OF MUNCIE, INDIANA.

FENDER.

1,137,606.  Specification of Letters Patent.  Patented Apr. 27, 1915.

Application filed October 21, 1914. Serial No. 867,881.

*To all whom it may concern:*

Be it known that we, JOHN F. GREEN and HAYDEN B. MAUCK, citizens of the United States, residing at Muncie, in the county of Delaware and State of Indiana, have invented new and useful Improvements in Fenders, of which the following is a specification.

This invention relates to fenders and particularly to that type adapted for automobiles, motor trucks, street cars, and like vehicles.

The principal object of the invention is to provide a fender which will effectually hold the object, animal, or person engaged thereby, and obviate the serious accidents frequently occurring and which are principally due to rebounding.

A further object of the invention is to provide a fender having a folding front frame which is released when an object is thrown onto the fender, and which is automatically thrown to and locked in vertical position so as to retain the object upon the fender.

Further objects of the invention will appear as the following specific description is read in connection with the accompanying drawings which form a part of this application, and in which:—

Figure 1 is a side elevation of the fender shown attached to an automobile. Fig. 2 is a top plan view. Fig. 3 is a front elevation. Fig. 4 is a detail side elevation showing the front frame in raised position. Fig. 5 is a detail vertical section taken on the line 5—5 of Fig. 1. Fig. 6 is a similar view on the line 6—6 of Fig. 1.

In the specific embodiment of the invention, as illustrated herein, we have shown the fender attached to the chassis 1 of a motor vehicle, but it will, of course, be understood that it may be readily attached to any other type of motor vehicle, by slightly modifying the mounting parts. The fender is attached to the chassis or other suitable support by the horizontal bars 2 connected together by a cross brace 3 and held in proper position by diagonal struts 4. The fender comprises a rear frame 5, and a front frame 6, both of which are substantially U-shaped in cross section and have connected to their sides or ends suitable springs 7 to which is attached a netting 8 of interwoven rope or amply flexible members. The rear frame is pivotally connected to the side bars as indicated at 9 and has that portion of its legs forward of the pivotal point arranged to extend downwardly and forwardly and adapted to ride a predetermined distance above the surface over which the vehicle is traveling. The upper or rear portion of the frame 5 is curved rearwardly and upwardly so as to form an abutment for the object, animal, or person received upon the fender. This frame is held normally in the position shown in Fig. 1 by links 10 which have their lower threaded ends passed through brackets 11 on the side bars 2 and are provided with adjusting nuts 12 surrounding the connecting links and springs 13 which normally act to force the upper end of the frame 5 forwardly and which take up any shock imparted to the frame by the engagement thereof by an object.

Secured to each terminal of the legs of the frame 5 are washer plates 14 having segmented heads overlying the upper and lower edges of the legs to prevent turning thereon, and journaled in these plates and in the legs are bolts 15 each having squared ends upon which are keyed the terminals of the legs of the frame 6 and the combined sprocket and ratchet wheels 16. These ratchet wheels have secured thereto the sprocket chains 17 and connected to the free terminal of the sprocket chains are heavy spiral springs 18, the opposite terminals of which are connected to the brackets 11. Each combined sprocket and ratchet wheel 17 is provided with a plurality of sprocket teeth and a plurality of ratchet teeth 19, and a locking notch 20 arranged to be engaged by the spring pressed dogs 21 slidably mounted in the casings 22 secured to the sides of the frame 5 and having laterally projecting arms 21ª integrally formed thereon. When the frame 6 is alined horizontally with the outer ends of the legs of the frame 5, the locking dogs 21 will be caught in the locking notches 20 so as to hold the parts in this position. When the dogs are released from the locking notches, the springs 18 through the sprocket chains 17 will rotate the wheels 16 and as these wheels are connected directly through the bolts 15 to the frame 6, the frame 6 will be turned upon its pivotal point and raised to vertical position, as will be hereinafter described. The retracting means for the dogs will then be released and they will engage in the ratchet notches and hold the frame in elevated position.

In order that the frame 6 may be raised as before described immediately when an object is thrown upon the fender, there is provided object actuated means for retracting the dogs from the locking notches. This means consists in attaching to the arms 21ª of the dogs the terminal ends of a cross cable 23 which passes beneath the netting 8 over pulleys 24 secured in brackets mounted upon the inner side of the frame 5. To this cross cable 23 is attached a plurality of cables 24, 25, and 26 all of which extend forwardly and pass over separate pulleys 27, 28 and 29, respectively, and are joined together above the netting within the approximate center of the fender by a ring 30. From this ring two anchoring cables 31 and 32 extend rearwardly and are connected to the upper end of the frame 5. All of the actuating cables are held taut when the frames are in the position shown in Fig. 6 so that immediately upon the occurrence of an object engaging the same by being thrown upon the fender, the cross cable will be drawn upon, which will cause the retraction of the dogs 21 against the tension of their springs. The ratchet wheels 16 being released, the springs 18 will turn said wheels through the sprocket chains and elevate the outer frame 6.

In order to prevent injury to the object, animal, or person thrown upon the fender by contact with either of the frames, there is provided a pneumatic tube 33 which extends entirely around and rests upon the upper side of both frames. This tube is inflated through a valve nipple 34 at the forward end of the frame 6. A similar pneumatic tube 35 inflated through a valve nipple 36 is arranged across the front of the frame so as to absorb any shocks imparted thereto. When an object, animal, or person is thrown violently against the netting on the rear frame, the links 10 will slide through the brackets 11 and the springs 13 will be compressed.

What is claimed is:—

1. In a fender, a pair of pivotally connected frames, means for attaching one of the frames to a vehicle, means for holding the other frame in substantial parallelism with the surface over which the vehicle is traveling, means acting to raise the last-named frame to vertical position when the holding means is released, flexible object-actuated means extending across the frames for releasing the holding means, and object-supporting netting extending across the frames.

2. In a fender, supporting members, a frame pivotally mounted upon the supporting members, a second frame pivoted to the first frame and adapted to be held in substantial parallelism with the surface over which the vehicle is traveling, means connecting the second frame and the supporting members and normally acting to raise the second frame to vertical position, spring pressed locking members for holding the second frame against movement, cables extended across the frame and connected to said locking members, said cables being adapted to be actuated by an object thrown upon the fender to release the locking members, and object-supporting netting stretched across the frame.

3. In a fender, supporting members, a frame connected thereto, a second frame pivotally mounted upon the first frame, sprocket wheels connected to the second frame, chains connected to said sprocket wheels, a spring connecting the chains and supporting members and adapted to be placed under tension when the second frame is in operative object-catching position, and object-released locking dogs engaged with the sprocket wheels for holding the second frame in object-catching position.

In testimony whereof we affix our signatures in presence of two witnesses.

JOHN F. GREEN.
HAYDEN B. MAUCK.

Witnesses:
J. EARL PATTERSON,
ROBERT I. PATTERSON.